US012456817B2

(12) United States Patent
Murto et al.

(10) Patent No.: US 12,456,817 B2
(45) Date of Patent: Oct. 28, 2025

(54) CONFORMAL AND FLEXIBLE LEAKY-WAVE ANTENNA ARRAYS WITH REDUCED MUTUAL COUPLINGS

(71) Applicant: OMNIFI, INC., Pleasanton, CA (US)

(72) Inventors: Tomi Murto, Ottawa (CA); Joseph Alan Epstein, Pleasanton, CA (US); Shulabh Gupta, Ottawa (CA)

(73) Assignee: Omnifi Inc., Pleasanton, CA (US)

( * ) Notice: Subject to any disclaimer, the term of this patent is extended or adjusted under 35 U.S.C. 154(b) by 293 days.

(21) Appl. No.: 18/338,555

(22) Filed: Jun. 21, 2023

(65) Prior Publication Data

US 2023/0420859 A1 Dec. 28, 2023

Related U.S. Application Data

(60) Provisional application No. 63/354,482, filed on Jun. 22, 2022.

(51) Int. Cl.
*H01Q 13/20* (2006.01)
*H01Q 1/52* (2006.01)

(52) U.S. Cl.
CPC ........... *H01Q 13/206* (2013.01); *H01Q 1/523* (2013.01)

(58) Field of Classification Search
CPC ...... H01Q 13/206; H01Q 1/523; H01Q 3/443; H01Q 21/08; H01Q 21/28; H01Q 11/04
See application file for complete search history.

(56) References Cited

U.S. PATENT DOCUMENTS

2017/0324144 A1 11/2017 Talty et al.
2020/0083605 A1* 3/2020 Quarfoth .............. H01Q 13/206
2025/0047005 A1* 2/2025 Pan ........................ H01Q 13/00

FOREIGN PATENT DOCUMENTS

CN 110071368 A 7/2019
CN 111682314 A 9/2020
CN 110071368 B * 11/2020 ............... H01Q 1/38

(Continued)

OTHER PUBLICATIONS

International Searching Authority, International Search Report and Written Opinion for International Application No. PCT/US2023/068769, mailed Oct. 10, 2023, 9 pages.

(Continued)

*Primary Examiner* — Seokjin Kim
(74) *Attorney, Agent, or Firm* — Baker Botts L.L.P.

(57) ABSTRACT

Methods and systems are disclosed for an antenna system capable of optimal broadside radiation. In certain embodiments, a system may include a flexible and thin polyethylene terephthalate (PET) substrate stack having a predetermined length. The system may include a printed circuit board (PCB) fabrication of one or more Leaky-Wave Antenna (LWA) structures on the PET substrate stack. The one or more LWA structures have a bent-stub folded LWA configuration have longitudinal asymmetry and transverse asymmetry for a broadside frequency. The bent-stub folded LWA configuration comprises a plurality of conductively unit cells having a unit cell period. Each unit cell of the plurality of conductively unit cells has a folded main feed-line and a bent stub pair with two angularly bent radiating stubs. Embodiments are structured to increase radiation per-unit length and suppress open stopband (OSB).

20 Claims, 20 Drawing Sheets

(56) References Cited

FOREIGN PATENT DOCUMENTS

| | | | | | |
|---|---|---|---|---|---|
| CN | 111969308 | A | | 11/2020 | |
| CN | 111969308 | B | * | 4/2023 | ............... H01Q 1/38 |
| JP | 2004172810 | A | | 6/2004 | |
| WO | WO-2023092469 | A1 | * | 6/2023 | |
| WO | WO-2023098985 | A1 | * | 6/2023 | |

OTHER PUBLICATIONS

Simin Baharlou, International Preliminary Report on Patentablity, Application No. PCT/US2023/068769, dated Jan. 2, 2025, 6 pages, pub. by the International Bureau of WIPO, Geneva, Switzerland.

* cited by examiner

COUPLED LWA PAIR

CONFORMAL AND FLEXIBLE LEAKY-WAVE ANTENNA ARRAYS WITH REDUCED MUTUAL COUPLINGS

BENEFIT CLAIM

This application claims the benefit under 35 U.S.C. § 119(e) of provisional application 63/354,482, filed 22 Jun. 2022, the entire contents of which is hereby incorporated herein by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent file or records, but otherwise reserves all copyright or rights whatsoever. © 2022-2023 Omnifi Inc.

TECHNICAL FIELD

One technical field of the present disclosure is antennas for radio-frequency wireless telecommunication. Other technical fields are the structure and manufacturing of bent-stub folded Leaky-Wave Antennas (LWA). Another technical field is multiple-input multiple-output (MIMO) based wireless communication systems.

BACKGROUND

A Leaky-Wave Antennas (LWA) is a beam-forming antenna that uses a traveling wave on a guiding structure as main radiating mechanism. The antenna can radiate from nearly resonant stubs to ensure a small leakage constant and a high directivity. For example, a guided wave leaks out of the guiding structure as the guided wave propagates. In some approaches, one or more sets of radiating elements of an LWA are fabricated on a printed circuit board (PCB), such as a thin generic polyimide substrate, for affordable prototyping and good electric performance. In this configuration, LWAs can provide directive broadside radiation over a wide bandwidth. LWAs are characterized by high directivity and ability to scan their main beam in the backwards and forwards directions, including broadside, based on an input frequency. This frequency scanning can be achieved without the need of phasing networks or mechanical steering, using simple low-profile structures either in a microstrip or substrate integrated waveguide (SIW) configuration.

LWAs can be designed to radiate at a specific broadside frequency, such as 5.5 gigahertz (GHz). However, LWAs suffer from gain degradation at the broadside due to open stopband (OSB) conditions. Having LWAs to suppress OSB to achieve a seamless transition from backward to forward radiation and a closed stopband (CSB) is desirable.

SUMMARY

The appended claims may serve as a summary of the invention.

DETAILED DESCRIPTION

Figure 1A:
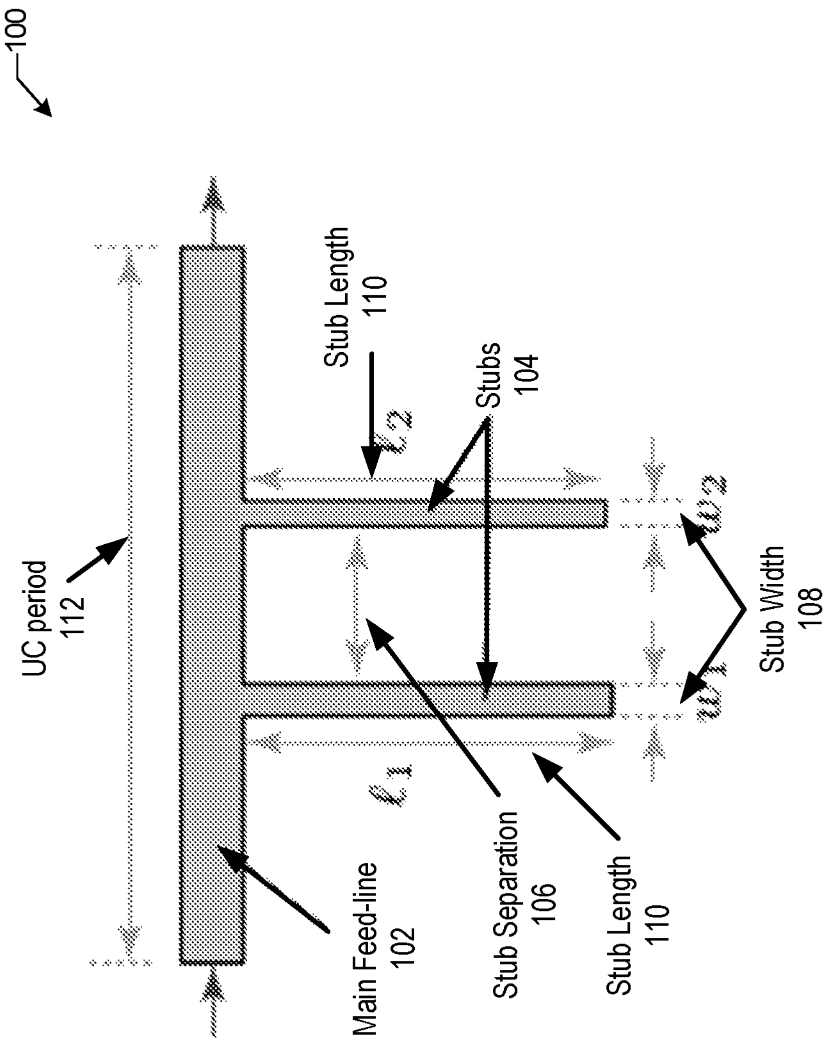
FIG. 1A illustrates an example schematic plan view of a unit cell for a conventional combline LWA structure 100.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis of interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions more fully. Similarly, although process steps, method steps, algorithms or the like may be described in a sequential order, such processes, methods and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of the more than one device or article.

The functionality or the features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Embodiments are described in sections below according to the following outline:

1. GENERAL OVERVIEW
2. STRUCTURAL AND FUNCTIONAL OVERVIEW
  2.1 LWA ANTENNA EXAMPLES
  2.2 LWA ANTENNA RESPONSE EXAMPLES
  2.3 LWA ANTENNA EXPERIMENTAL EXAMPLES
3. PROCEDURAL OVERVIEW
4. IMPLEMENTATION EXAMPLES

1. General Overview

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve the developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

Embodiments provide LWAs that can be used in an arrayed configuration in MIMO-based wireless communication systems. In particular, LWAs of the disclosure provide low cost and high gain using different scenarios and avoid the OSB condition to ensure optimal broadside radiation as a beam is scanned through broadside of the antenna. Embodiments can be installed on curved surfaces of structures such as walls, windows, and cylindrical pillars. As a result, LWAs of the disclosure can reduce costs for specified applications, such as in spectrum analysis, direction finding, analog multiplexing and demultiplexing, which may be associated with directive indoor and outdoor wireless communication. For example, an array of LWAs can be used to increase angular coverage of the antenna structure while retaining broadband and high radiation performance of the overall antenna.

In one embodiment, a single LWA antenna comprises a conformal and flexible bent-stub folded combline LWA structure disposed on a flexible and thin polyethylene terephthalate (PET) substrate stack having a predetermined length. The flexible substrate can have an effective thickness of 1.2 millimeter (mm). For example, the flexible PET substrate stack consists of a polyimide-adhesive-PET-adhesive ground configuration of PET and polyimide sheets. As another example, the flexible PET substrate stack comprises a heavy-duty spray adhesive applied on both the PET and polyimide sheets.

In an embodiment, a single LWA antenna uses a guiding structure to enable the propagation of a wave of a particular broadside frequency along the length of structure and continuously radiate the wave along the structure. The particular broadside frequency is a frequency at which main beam is normal to the antenna plane. For example, the single LWA antenna can radiate at a particular broadside frequency in the range of 4.5 gigahertz (GHz) to 6.5 GHz. As another example, the single LWA antenna can radiate at a particular broadside frequency around 5.5 GHz. While conventional LWA antennas suffer from gain degradation at broadside due to OSB, the present disclosure provides an LWA structure that can suppress gain degradation and close the stopband to achieve a seamless transition from backward to forward radiation and a close stopband.

The single LWA antenna can include longitudinal and transverse asymmetry for achieving a close stopband condition for broadside radiation in an optimized configuration. For example, the single LWA antenna can use optimized asymmetries along the longitudinal and/or transverse axes of the LWA unit cells (UC) to achieve optimal radiation with not stopband.

In certain embodiments, the methods and systems of the present disclosure may fold the main feed-line of the structure to effectively decrease the UC period of the LWA structure, and increase radiation leakage per unit length and scan range. As a result, the single LWA antenna can use two different radiating stubs for matching and suppression of the OSB condition in order to achieve consistent antenna gain across radiation bandwidth. Likewise, the single LWA antenna can use a folded feed-line to increase radiation per unit length.

In one embodiment, an antenna system comprises a printed circuit board (PCB) fabrication of one or more LWA structures on the PET substrate stack. The one or more LWA structures can have a bent-stub folded LWA configuration with longitudinal asymmetry and transverse asymmetry for a broadside frequency. The broadside frequency can be any frequency that is specified, particular, or desired for a particular application.

The bent-stub folded LWA configuration can comprise a plurality of conductively UCs having a unit cell period of p. Each unit cell of the plurality of conductively UCs has a folded main feed-line to increase radiation per-unit length and a bent stub pair with two angularly bent radiating stubs to suppress the OSB condition. For example, the LWA structure can be a coupled LWA antenna in an arrayed configuration by interweaving two identical folded single LWAs with half a period offset in a two-element array configuration. The coupled LWA antenna can provide a significant decrease in coupling between input ports of the antenna in MIMO based wireless communication systems. Likewise, the coupled LWA antenna can increase angular coverage of various broadside frequencies of interest.

In an embodiment, a manifold LWA antenna comprises at least two pairs of coupled LWAs. As a result, the coupled LWA antenna and the manifold LWA antenna can be used to achieve a high gain within the same physical length of the antenna and support multiple independent MIMO data streams.

2. Structural and Functional Overview

In an embodiment, a combline LWA structure is typically a 2-port structure whose main beam angle scans with frequency from backward to forward regions, including broadside. The LWA structure can be characterized by its frequency-dependent complex propagation constant $\gamma(\omega)$ based on Equation 1. These constants are electrically large associated with high efficiency and high gain without the need for complex feeding networks. The phase shift between the LWA UCs can be determined by the propagation constant per unit length $\beta(\omega)$ along the antenna structure. In particular, the main beam direction, such as scan angle $\theta(\omega)$, can be measured from the broadside axis, such as z axis, in the beam-scanning law based on Equation 2. For the class of periodic antennas where the radiation occurs from n=−1 harmonic, the scan angle $\theta(\omega)$ can be related to the periodicity of the structure based on Equation 3.

$$\gamma(\omega) = \alpha(\omega) + j\beta(\omega) \quad \text{Equation 1}$$

$$\theta(\omega) = \sin^{-1}\left[\frac{\beta(\omega)}{k_o}\right] \quad \text{Equation 2}$$

$$\beta(\omega) \approx \beta_o(\omega) - \frac{2\pi}{p} \quad \text{Equation 3}$$

where $\alpha$ is leakage per unit length, $\beta$ is the propagation constant per unit length along the antenna structure, $\omega$ is frequency, $k_o$ is the free-space wavenumber, c is the wave-speed of a beam, $\beta_o(\omega)$ is the propagation constant of the fundamental mode of the waveguiding structure and p is the periodicity of the LWA structure.

In an embodiment, the combline LWA structure is designed to maximize radiation performance in backward, forward, and broadside regions. In particular, the combline LWA structure is designed to increase mechanical flexibility by adapting its characteristics in response to the behavior of the wireless channel. For example, for 5 GHz Wi-Fi bands various antenna structures can be focused on a broadside frequency around 5.5 GHz. As another example, a broadband antenna operation is required for frequency scanning from backward to forward including broadside with a CSB. In particular, the combline LWA structure can radiate all the input power in a given length to minimize transmission energy, such as $|S_{21}|=0$. Thus, there is no termination on the output end. As another example, the LWA structure is disposed on a thin substrate to maintain antenna flexibility and conformity while maintaining electrical performance.

2.1 LWA Antenna Examples

FIG. 1A illustrates an example schematic plan view of a unit cell for a conventional combline LWA structure 100. The conventional combline LWA structure 100 can be a planar single layer one-dimensional (1D) periodic LWA antenna. The conventional combline LWA structure 100 can contain many symmetrical series-fed patches (SFPs) as unit cells in the antenna. Each unit cell includes a straight feed-line 102 with two identical stubs 104 on the same side, which radiates due to fringing fields near edges. In particular, the resonant patch UC can have a UC period 112 of p. Typically, for LWAs radiating in the n=−1 spatial harmonic, the UC period 112 of p is about $\lambda_g$ which is a guided wavelength. The patch occupies a significant amount of space in the UC than the stubs 104. Likewise, a plurality of SFP arrays is simply placed next to each other with sufficient stub separation 106. For example, the stubs 104 can have different stub widths 108, such as $w_1$ and $w_2$, and stub lengths 110, such as $l_1$ and $l_2$, with a stub separation 106 of s. The conventional combline LWA structure 100 can steer directive beam from broadside to backward and forward angles. Therefore, when a radio frequency (RF) signal is transmitted to the input port, the traveling wave of the RF signal progressively leaks power as the RF signal travels along the waveguide structure. Compared to standard antenna which radiates with a fixed pattern and polarization, the conventional combline LWA structure 100 can dynamically change its radiation properties in response to the multi-variate behavior of the wireless channel to achieve improved throughput maximization, interference management, directional networking, and security. An example of dimensions of various unit cell configurations can be found in Table 1 below.

TABLE 1

An example of dimensions of various unit cell configurations.

| Dimension | Conventional Combline LWA Value (mm) | Folded Combline LWA Value (mm) | Bent-Stub Folded Combline LWA Value (mm) |
|---|---|---|---|
| p | 35.48 | 26.31 | 26.02 |
| s | 7.000 | 7.891 | 7.469 |
| $l_1$ | 17.50 | 17.83 | 17.83 |
| $l_2$ | 17.60 | 17.51 | 17.51 |
| $w_1$ | 1.4 | 1.617 | 1.610 |
| $w_2$ | 1.0 | 1.232 | 1.045 |
| v | — | 2.617 | 1.680 |
| $h_1$ | — | 1.771 | 1.680 |
| $h_2$ | — | 1.823 | 1.985 |
| PET Substrate Parameters | $\varepsilon_r = 2.88$ $h_o = 1.2$ mm | Stub angle $\theta = 10°$ | Number of Cells N = 15 |

Figure 1B:
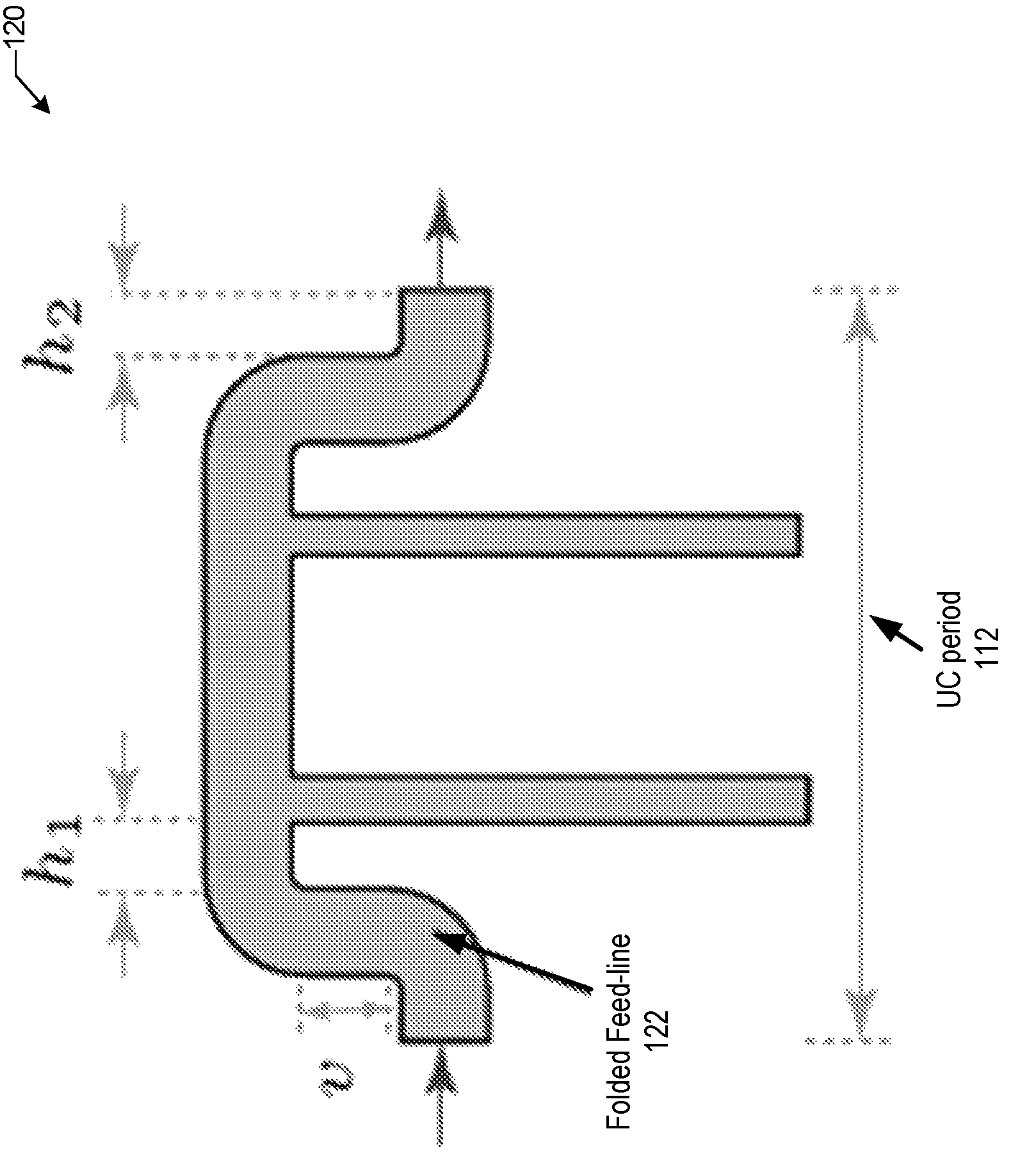
FIG. 1B illustrates an example schematic plan view of a meandered unit cell for a folded combline LWA structure 120.

FIG. 1B illustrates an example schematic plan view of a meandered unit cell for a folded combline LWA structure 120. The folded combline LWA structure 120 has a folded feed-line 122 to maximize radiated power and antenna gain within the same physical length of the antenna. Compared to the conventional combline LWA structure 100, the folded combline LWA structure 120 has a reduced UC period 112 of p, allowing for incorporating more UCs within a given length for increased radiated power. For example, the unit cell period 112 of p is less than a guided wavelength at the broadside frequency. The folded feed-line 122 is controlled by three folding dimension parameters, such as $h_1$, $h_2$, and v. The folded combline LWA structure 120 also has other benefits compared to the conventional combline LWA structure 100. For example, the folded combline LWA structure 120 can increase leakage per unit length, scan range, and inter-antenna coupling using bent-stubs when placed in an array configuration. As another example, the folded combline LWA structure 120 can maintain broadside frequency with some small modifications by maintaining the same electrical length between input end and output end of the feed-line. An example of dimensions of various unit cell configurations can be found in Table 1 above.

Figure 1C:
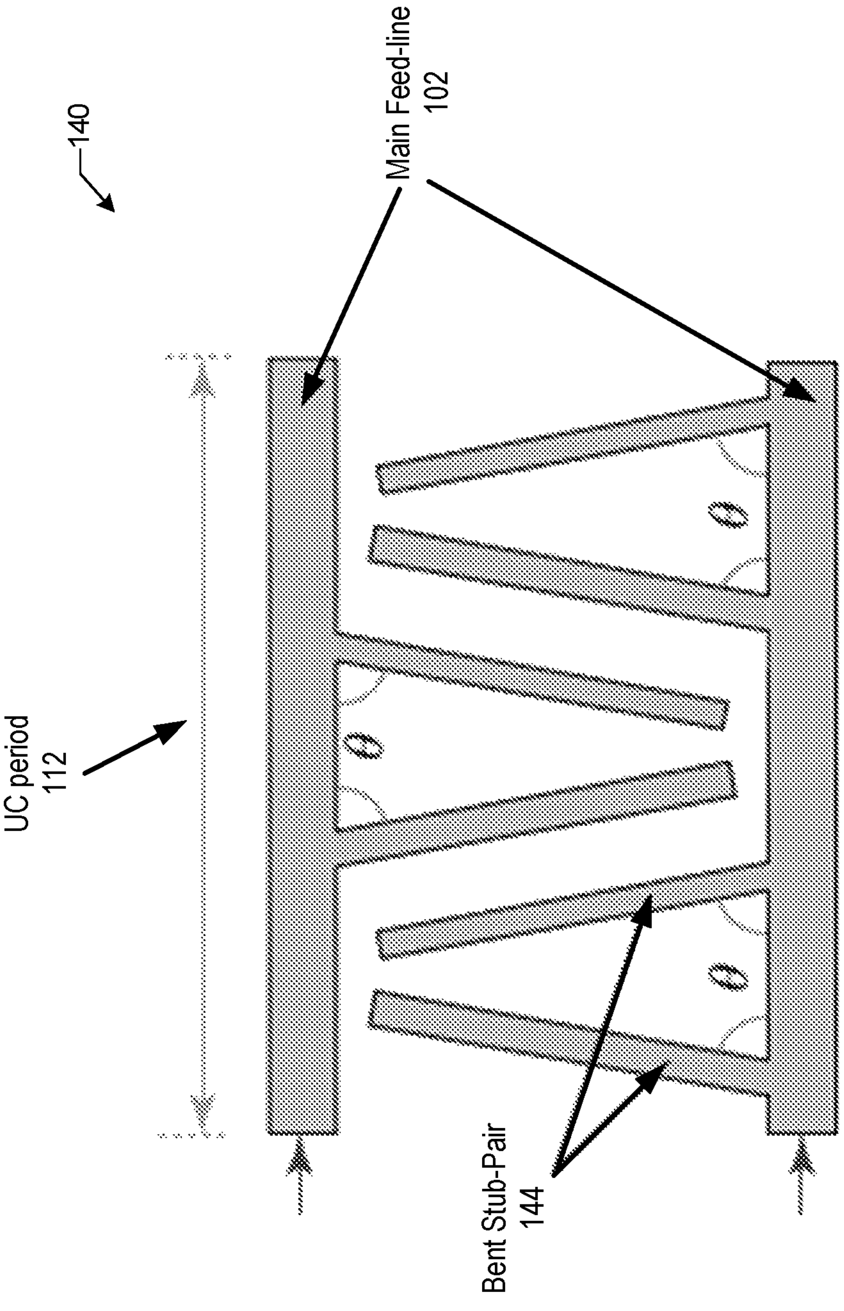
FIG. 1C illustrates an example schematic plan view of a unit cell for a bent-stub combline LWA array 140.

FIG. 1C illustrates an example schematic plan view of a unit cell for a bent-stub combline LWA array 140. The bent-stub combline LWA array 140 comprises two LWAs in a coupled LWA pair. The coupled LWA pair comprises two antennas that are interleaved with angularly bent stubs 144 in a two-element array configuration, and in which one of the two antennas is shifted by a half of the unit cell period 112 of p. In particular, the angular orientation θ of each stub of the bent stub pairs with respect to the main feed-line 102. For example, for the conventional combline LWA structure 100, the angular orientation θ of each straight stub 104 is zero writhe respect to the main feed-line 102. The bent-stub combline LWA array 140 can adjust the tilted angular orientations of the bent stub pairs 144 to control the couplings between the two antennas' input ports, while keeping them close to each other in the transverse plane to maintain compactness. As another example, the two angularly bent radiating stubs 144 have an angular orientation θ which is optimized to reduce mutual coupling between input ports of the antennas. Likewise, the two angularly bent radiating stubs are separated by a distance that minimizes the OSB condition at the broadside frequency. For example, the distance is a quarter of the guided wavelength at the broadside frequency. An example of dimensions of various unit cell configurations can be found in Table 1 above.

Figure 1D:
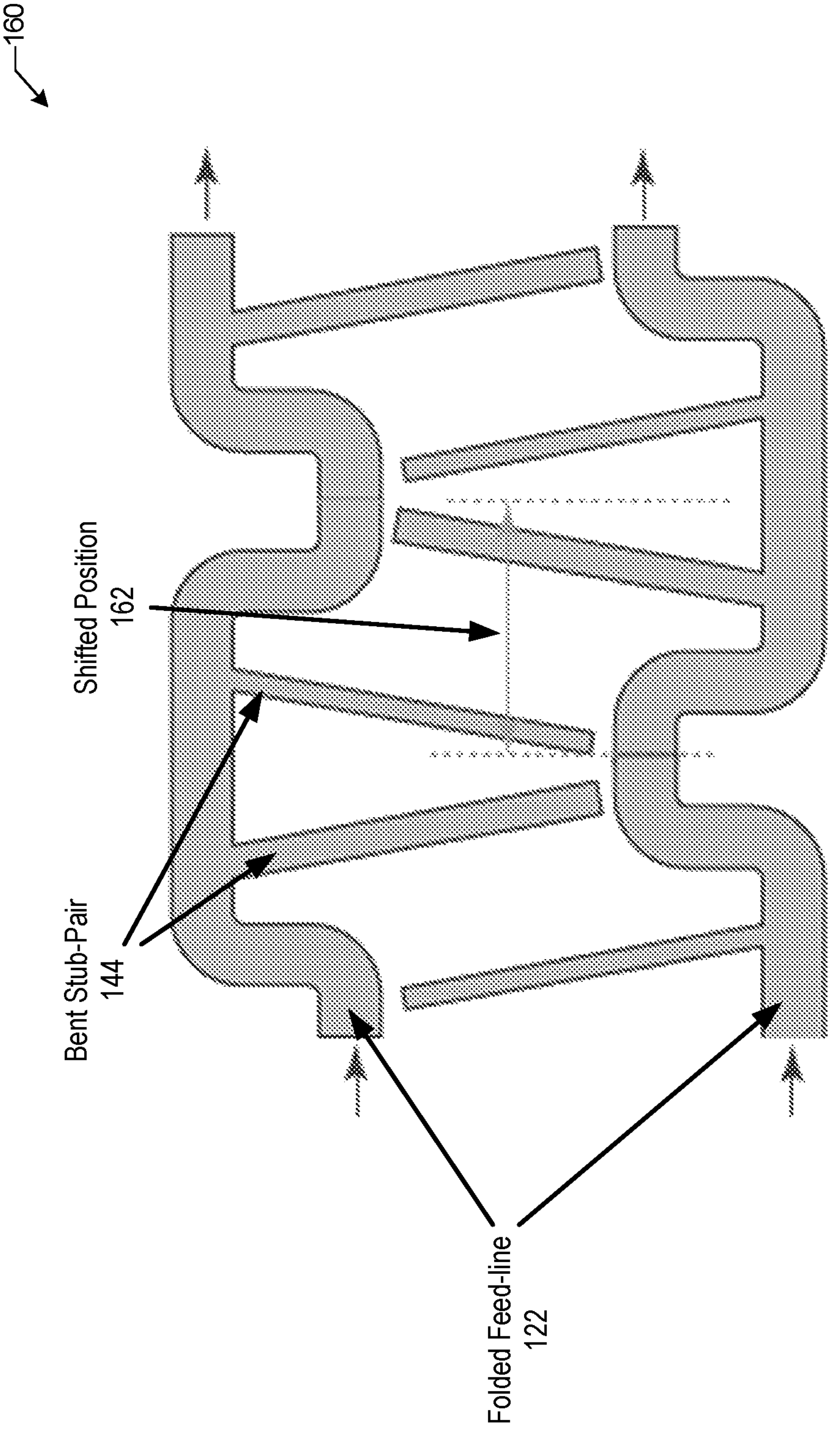
FIG. 1D illustrates an example schematic plan view of a unit cell for a bent-stub folded combline LWA array 160.

FIG. 1D illustrates an example schematic plan view of a unit cell for a bent-stub folded combline LWA array 160. The bent-stub folded combline LWA array 160 has introduced folded feed-line 122 to provide a simultaneous reduction in the coupling between the input ports of the antennas, and an increase in antenna gain and scan range. In particular, in the bent-stub folded combline LWA array 160 the bend angle can be optimized to reduce the mutual coupling between the input ports of the antennas. The bent-stub folded combline LWA array 160 can also have bent stub pairs 144 and interweave two combline antennas by shift one of them by a shifted position 162, such as half of the UC period 112 of p. In particular, the angular orientation θ of each stub of the bent stub pairs with respect to the feed-line. The bent-stub folded combline LWA array 160 can adjust the tilted angular orientations of the bent stub pairs 144 to control the couplings between the two antennas' input ports, while keeping them close to each other in the transverse plane to maintain compactness. An example of dimensions of various unit cell configurations can be found in Table 1 above.

2.2 LWA Antenna Response Examples

Figure 2A:
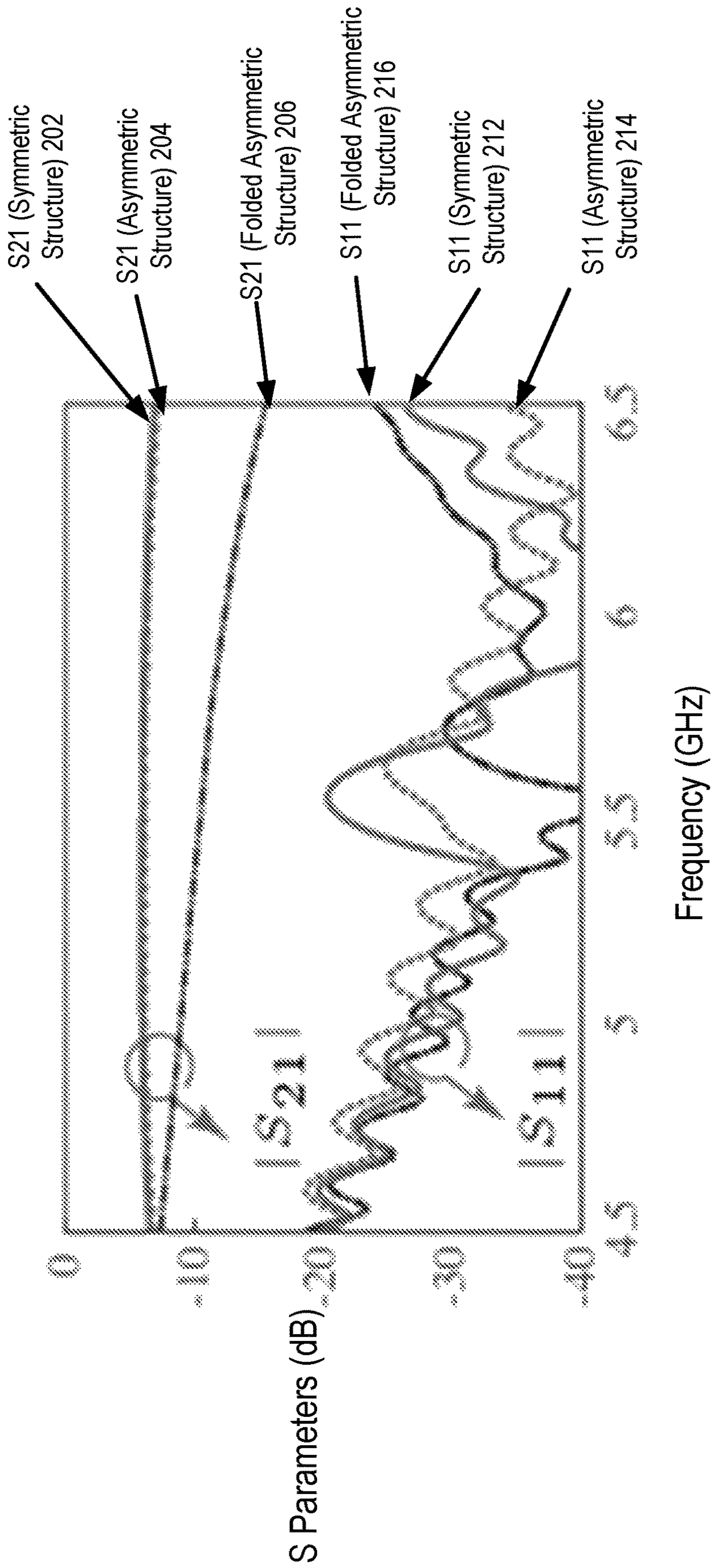
FIG. 2A illustrates an example S-parameters response of a unit cell for a conventional combline LWA structure 100 and a folded combline LWA structure 120.

FIG. 2A illustrates an example S-parameters response of a unit cell for a conventional combline LWA structure 100 and a folded combline LWA structure 120. FIG. 2A shows the S-parameters response, such as reflection $S_{11}$ and transmission $S_{21}$, of a unit cell for a conventional combline LWA structure 100 for transversal symmetric and asymmetric structures. The unit cell for a conventional combline LWA structure 100 includes a straight feed-line 112 with two identical stubs 104 on the same side, thus introducing a longitudinal asymmetry. The stub separation 106 of s between different stubs is about $\lambda_g/4$ which is optimized for OSB suppression at the broadside frequency. In particular, the transverse symmetric structure includes identical stubs with the same stub length, such as $l_1=l_2$, and stub width, such as $w_1=w_2$. The asymmetric structure includes different stubs with different stub length, such as $l_1\neq l_2$, and stub width, such as $w_1\neq w_2$. As a result, the S-parameters can be used to determine input-output relationship between ports or terminals in the conventional LWA structure 100. In particular, the reflection $S_{11}$ parameter represents a reflection coefficient associated with how much power is reflected at input port from the antenna. For example, if $S_1$=20 dB, the reflected power is 10 decibels (dB) for an input power of 10 dB as all the input power is reflected from the antenna with no radiation. As another example, if $S_{11}$=−20 dB, the reflected power is −10 dB for an input power of 10 dB. Likewise, the transmission $S_{21}$ parameter represents a transmission coefficient associated with how much power is received at output port of the antenna. For example, if $S_{21}$=0 dB, the transmission power is 10 dB for an input power of 10 dB as all the input power is transmitted to the output port of the antenna with no radiation. As another example, if $S_{21}$=−20 dB, the transmitted power is −10 dB for an input power of 10 dB.

In an embodiment, the S-parameter responses are very similar for symmetric structure, such as $S_{21}$ (symmetric structure) 202 versus $S_{21}$ (asymmetric structure) 204 and $S_{11}$ (symmetric structure) 212 versus $S_{11}$ (asymmetric structure) 214. The similar S-parameters responses suggest a slight addition of transversal asymmetry with no effect on the transmission which is about 6 dB at broadside. Furthermore, the S-parameter responses for symmetric and asymmetric structures are flat when the antenna radiates seamlessly from backward to forward through broadside at 5.5 GHz, indicating that the OSB condition is effectively suppressed.

In an embodiment, FIG. 2A shows the S-parameters response, such as $S_{21}$ (folded asymmetric structure) 206 and $S_{11}$ (folded asymmetric structure) 216 of a unit cell for a folded combline LWA structure 120 for asymmetric structure. The S-parameter responses for the folded combline LWA structure 120, such as $S_{21}$ (folded asymmetric structure) 206 and $S_{11}$ (folded asymmetric structure) 216, show significantly reduced transmission and reflection at broadside frequency compared to the S-parameters responses for the conventional combline LWA structures 100, such as $S_{21}$ (symmetric structure) 202 and $S_{21}$ (asymmetric structure) 204, $S_{11}$ (symmetric structure) 212, and $S_{11}$ (asymmetric structure) 214, when the antenna radiates seamlessly from backward to forward through broadside at 5.5 GHz. Therefore, the folded combline LWA structure 120 has an improved radiation compared to the conventional LWA structure 100.

Figure 2B:
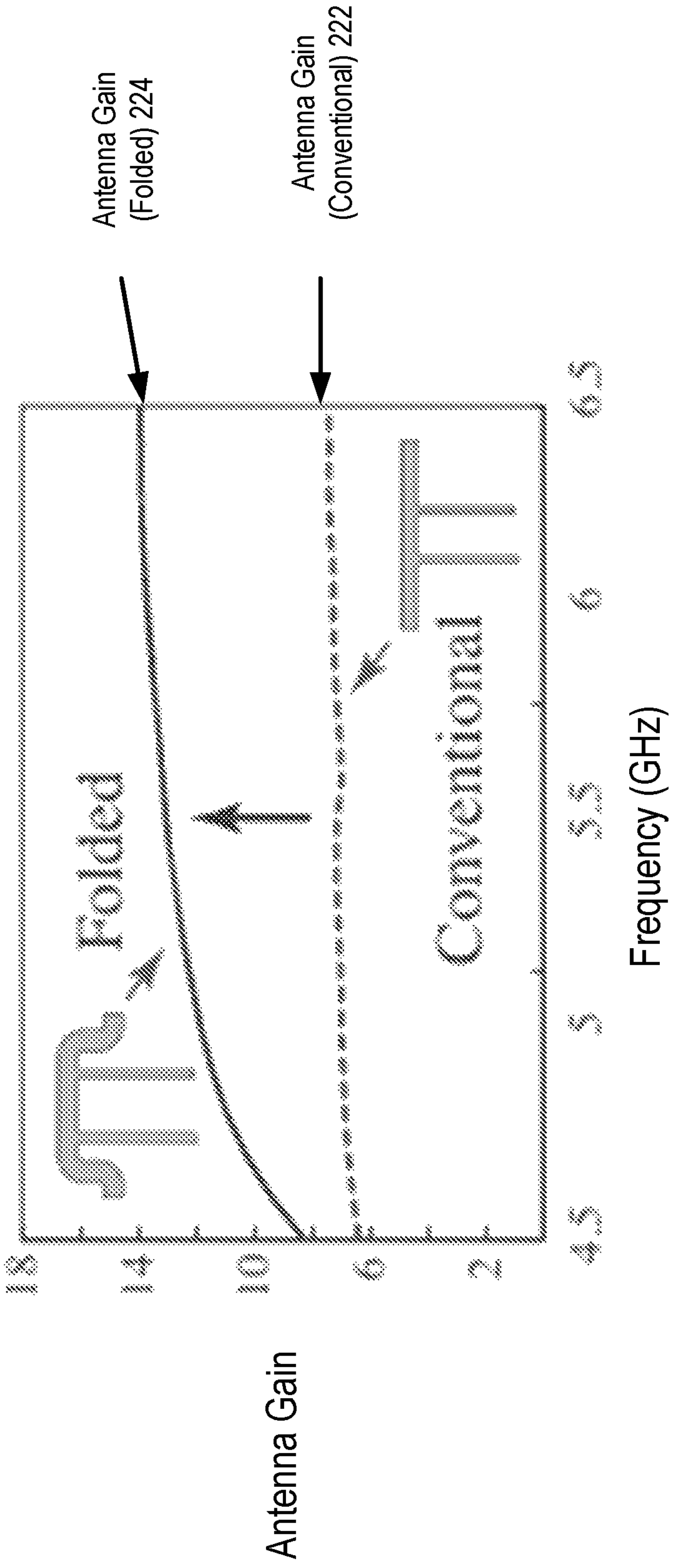
FIG. 2B illustrates an example antenna gain responses of unit cells for a conventional combline LWA structure 100 and a folded combline LWA structure 120.

FIG. 2B illustrates an example antenna gain responses of unit cells for a conventional combline LWA structure 100 and a folded combline LWA structure 120. The antenna gain response is determined by a realized co-polarized gain $G_{\varphi}(\theta, \varphi=90°)$ across the frequency. In particular, FIG. 2B shows the conventional LWA structure 100 has a flat antenna gain 222 of 6 dB between 4.5 GHz and 6.5 Hz. Likewise, the folded combline LWA structure 120 has an antenna gain 224 which gradually increase from about 8 dB at 4.5 GHz to 14 dB at 6.5 GHz. It is clear that the folded combline LWA structure 120 has an increased antenna gain per unit length and scanning range compared to the conventional LWA structure 100.

Figure 2C:
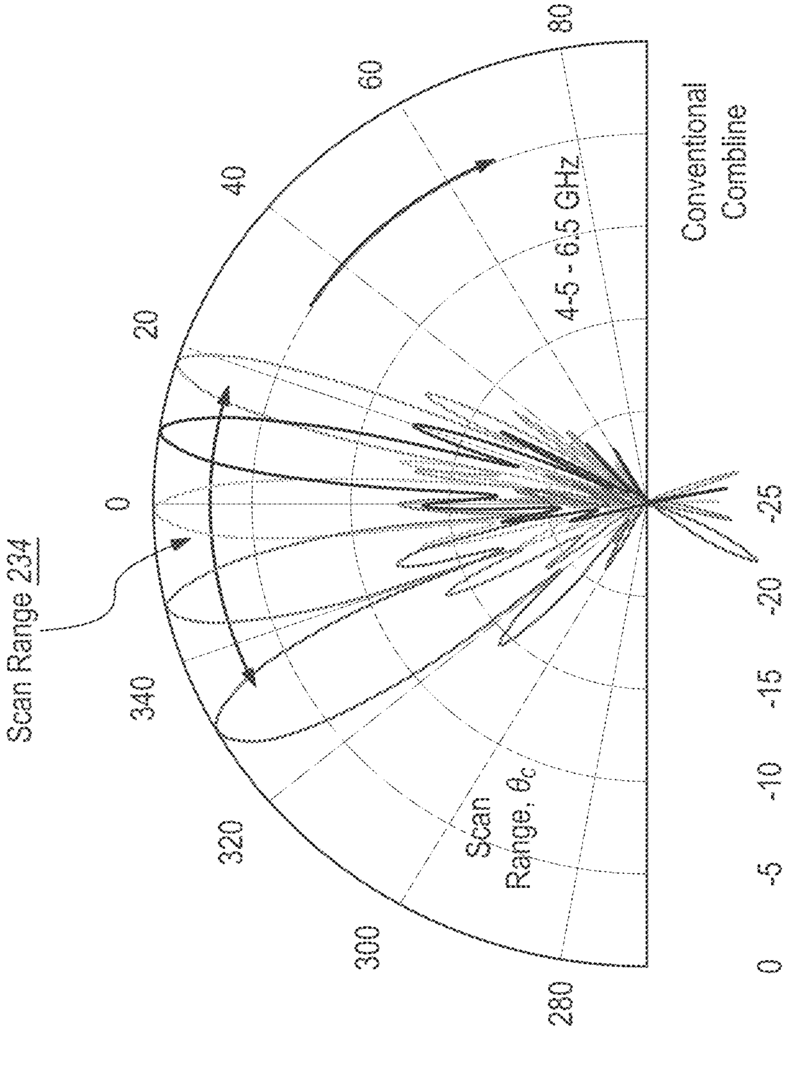
FIG. 2C illustrates an example radiation pattern of a unit cell for a conventional combline LWA structure 100.

FIG. 2C illustrates an example radiation pattern of a unit cell for a conventional combline LWA structure 100. In particular, FIG. 2C shows a scan angle of about 46° between 4.5 GHz and 6.5 Hz when the antenna seamless scans from backward to forward including broadside frequency. The scan angle is inversely proportional to the UC period p.

Figure 2D:
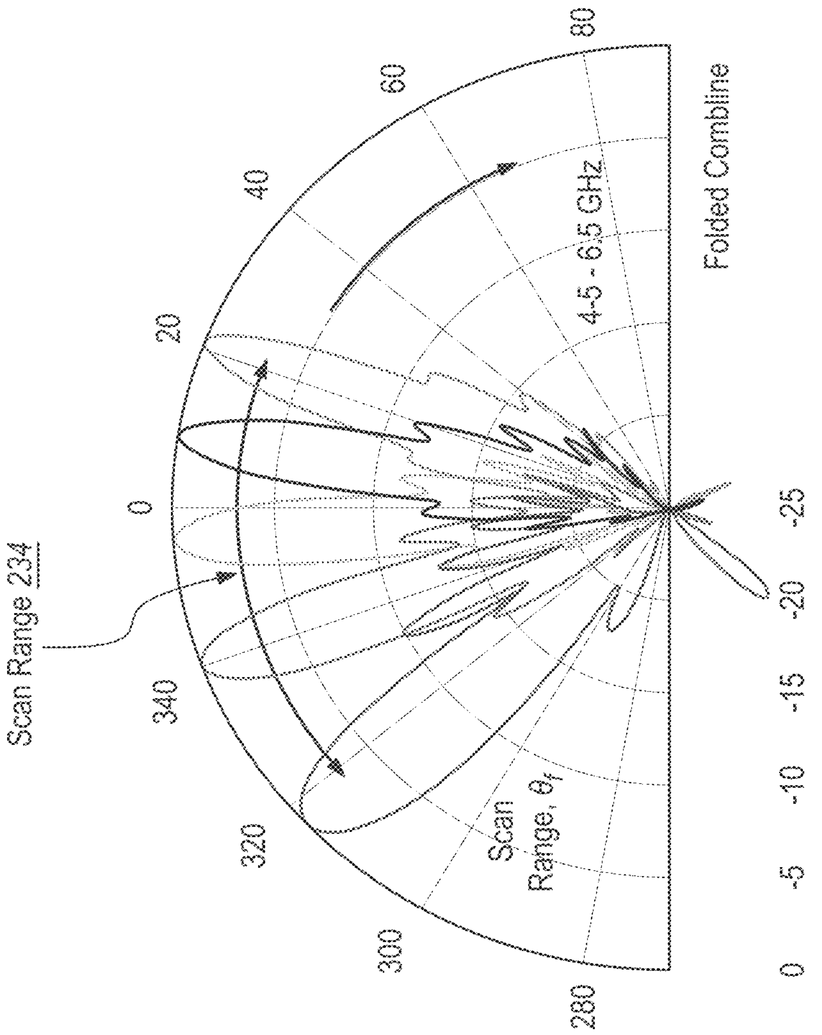
FIG. 2D illustrates an example radiation pattern of a unit cell for a folded combline LWA structure 120.

FIG. 2D illustrates an example radiation pattern of a unit cell for a folded combline LWA structure 120. In particular, FIG. 2D shows a scan angle of about 64° between 4.5 GHz and 6.5 Hz when the antenna seamless scans from backward to forward including broadside frequency. The increased scan angle for the folded combline LWA structure 120 indicates an increased frequency scanning sensitivity due to reduced periodicity via folding.

Figure 3:
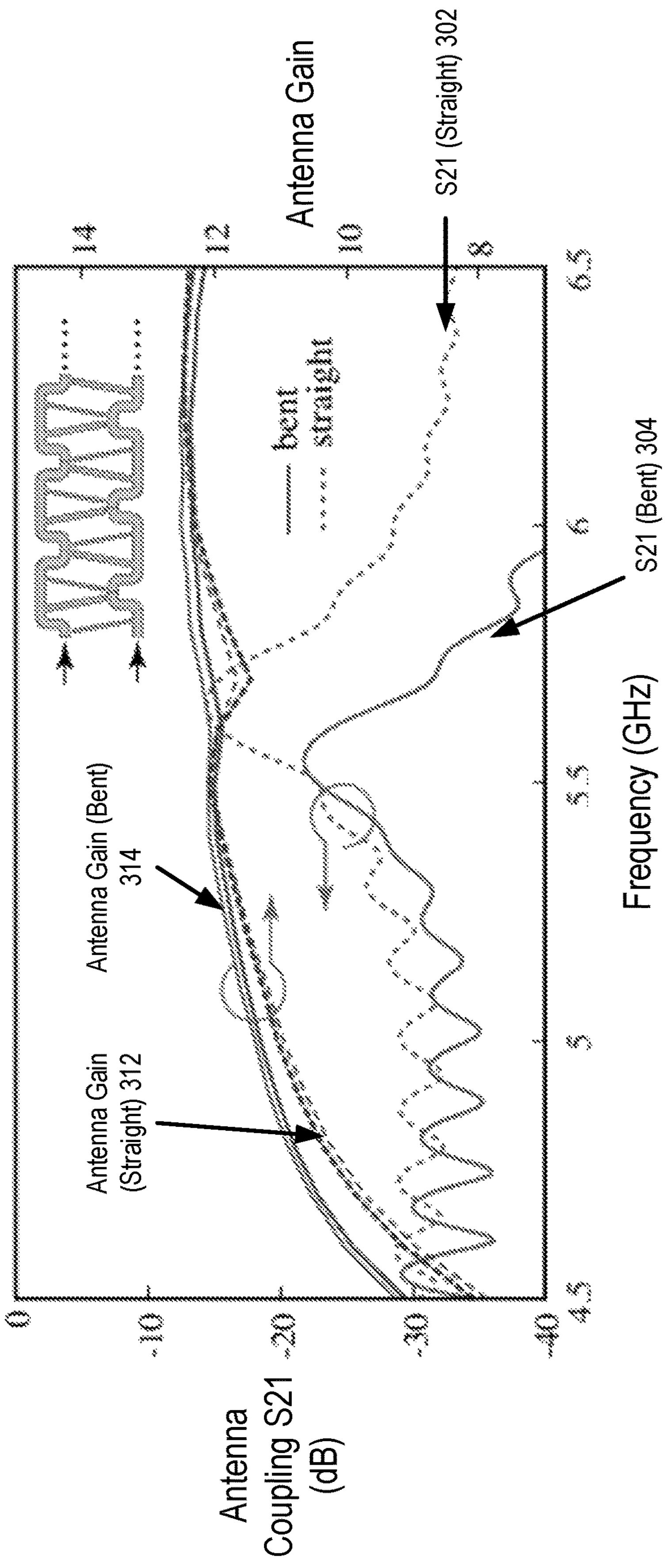
FIG. 3 illustrates an example backward coupled S-parameter $S_{21}$ and frequency-dependent peak gain of a unit cell for a bent-stub folded combline LWA structure 160.

FIG. 3 illustrates an example backward coupled S-parameter $S_{21}$ and frequency-dependent peak gain of a unit cell for a bent-stub folded combline LWA structure 160. In MIMO based communication systems, various applications of LWA arrays require a plurality of antennas are simultaneously operated in closed proximity as in an array configuration. The bent-stub folded combline LWA structure 160 can be built by interweaving two combline antennas by shifting one of them by half of UC period of p. For example, the bent-stub folded combline LWA structure 160 can have straight stubs with a tilt angle of 0. As another example, the bent-stub folded combline LWA structure 160 can have bent stubs with a tilt angle θ. The radiation characteristics are associated with mutual coupling between the plurality of antennas. It clearly shows different mutual coupling responses, such as antenna coupling $S_{21}$ (straight) 302 for the bent-stub folded combline LWA structure 160 with straight stubs and antenna coupling $S_{21}$ (bent) 304 for the bent-stub folded combline LWA structure 160 with bent stubs, between 4.5 GHz and 6.5 Hz. Likewise, the frequency-dependent peak gain gradually increases from 4.5 GHz to 6.5 Hz. The frequency-dependent peak gain for the bent-stub folded combline LWA structure 160 with straight stubs, such as antenna gain (straight) 312) is slight smaller than the frequency-dependent peak gain for the bent-stub folded combline LWA structure 160 with bent stubs, such as antenna gain (bent) 314. Therefore, the tilt angle θ can be optimized to control the couplings between the two input ports of the antennas, while keeping them close to each other in the transverse x-z plane to maintain compactness. For example, a general LWA UC configuration, such as the bent-stub folded combline LWA structure 160 with bent stubs, can provide a simultaneous reduction in the coupling between the input ports, and an increase in antenna gain and scan range. Thus, the bent-stub folded combline LWA structure 160 with bent stubs can reduce coupling between the antenna input ports in a wide band and overall increased peak gain of the antennas (from both input ports) across the frequency band. In particular, the optimal tilt angle θ can be used to reduce the mutual coupling between the input ports of the antennas, which is observed to be significantly higher near broadside. For example, the maximum usable tilt angle θ is limited by the proximity of the tips of the stubs.

2.3 LWA Antenna Experimental Examples

Figure 4A:
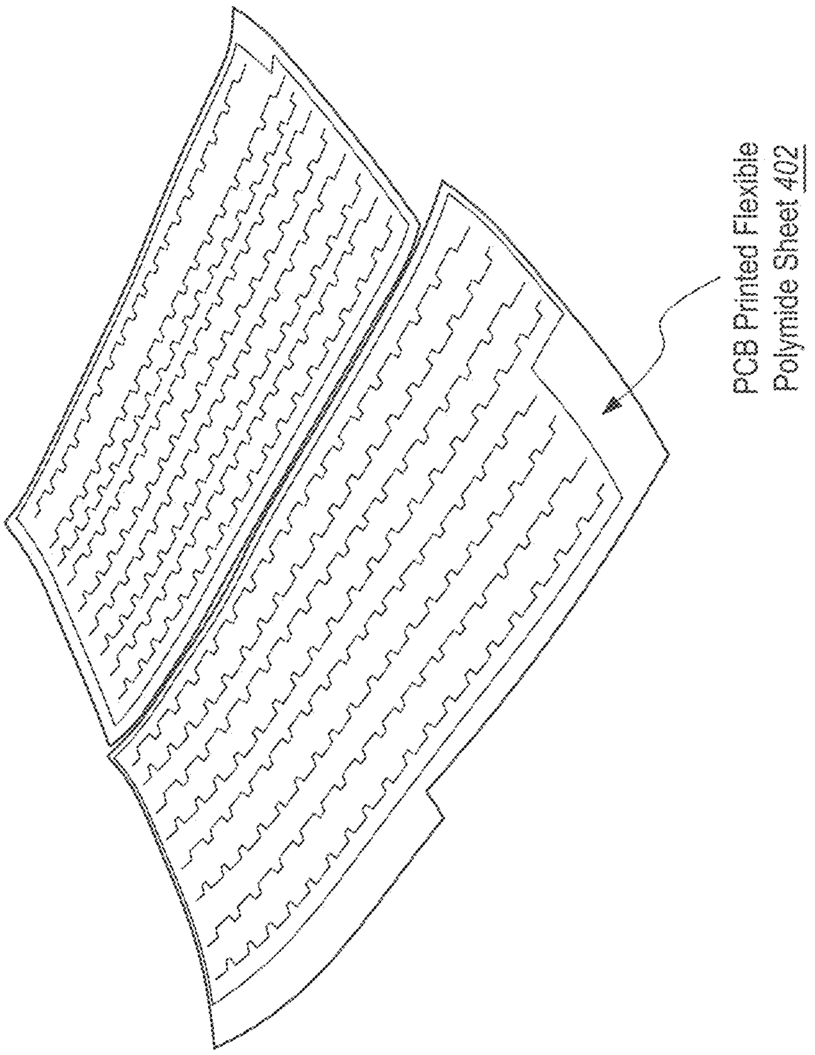
FIG. 4A illustrates an example LWA antenna on a thin generic polyimide sheet.

FIG. 4A illustrates an example LWA antenna on a thin generic polyimide sheet. In particular, one or more LWA antenna patterns can be etched on a thin generic polyimide sheet, such as printed circuit board (PCB) printed flexible polyimide sheet 402. For example, a PCB process with copper conductor traces is used for the fabrication of the LWA antenna patterns on the thin generic polyimide substrate for affordable prototyping while maintaining good electrical performances. As another example, a silver inkjet printing is used for the fabrication of the LWA antenna patterns on polymers for lower trace conductivities and thus more losses. In particular, the polyimide can have a thickness of 25 micrometers (um) and $\varepsilon_r$ of 3.38 at 1 megahertz (MHz). Likewise, the polyimide can have an overlay of a thickness of 50 um and $\varepsilon_r$ of 3.3 at 10 GHz to protect the copper trace from accidently peeling off from the polyimide film.

Figure 4B:
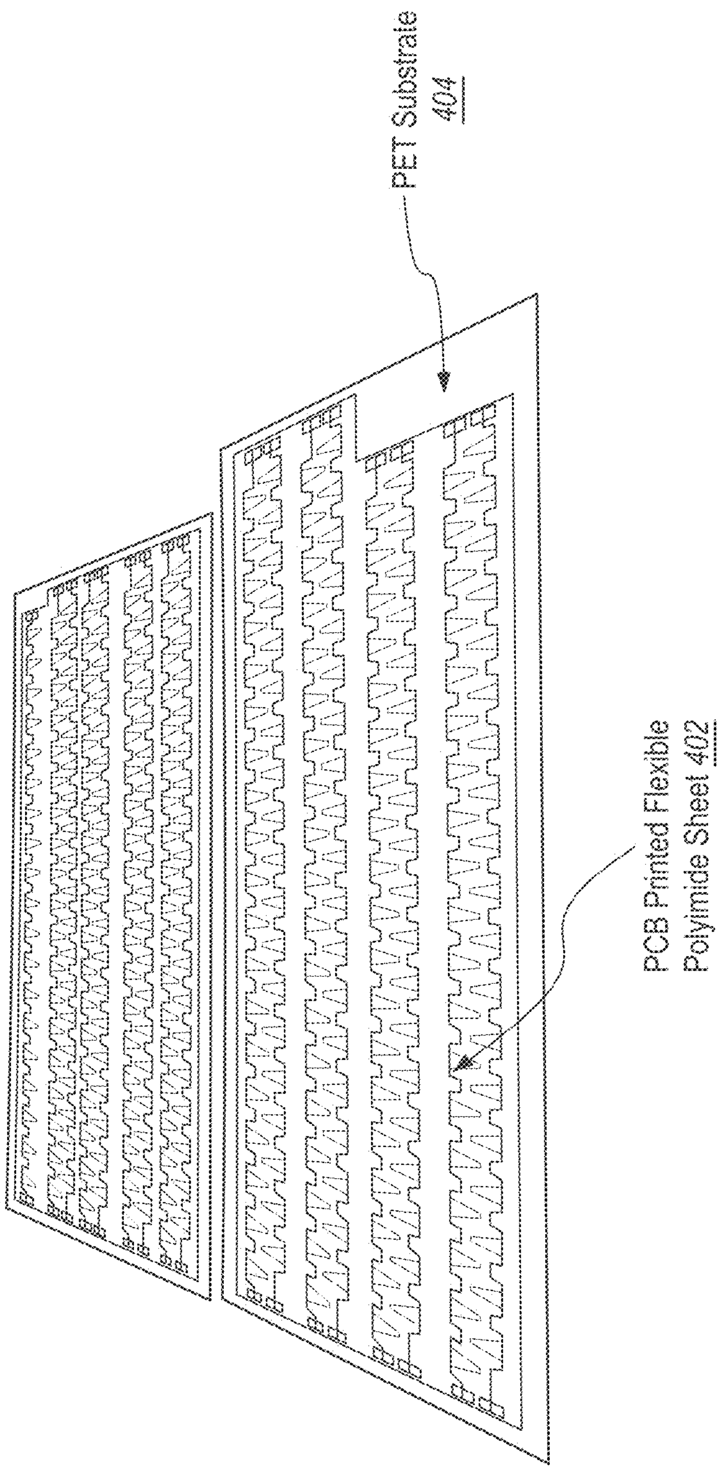
FIG. 4B illustrates an example LWA antenna and polyimide sheet on a PET substrate.

FIG. 4B illustrates an example LWA antenna and polyimide sheet on a PET substrate. The PCB printed flexible polyimide sheet 402 can be bonded to a PET substrate 404. For example, the PET substrate 404 is 1 millimeter (mm) thick and has an $\varepsilon_r$ of 3.0 at 1 MHz. Bonding can be accomplished with a heavy duty spray adhesive applied on both the PCB printed flexible polyimide sheet 402 and the PET substrate 404.

Figure 4C:
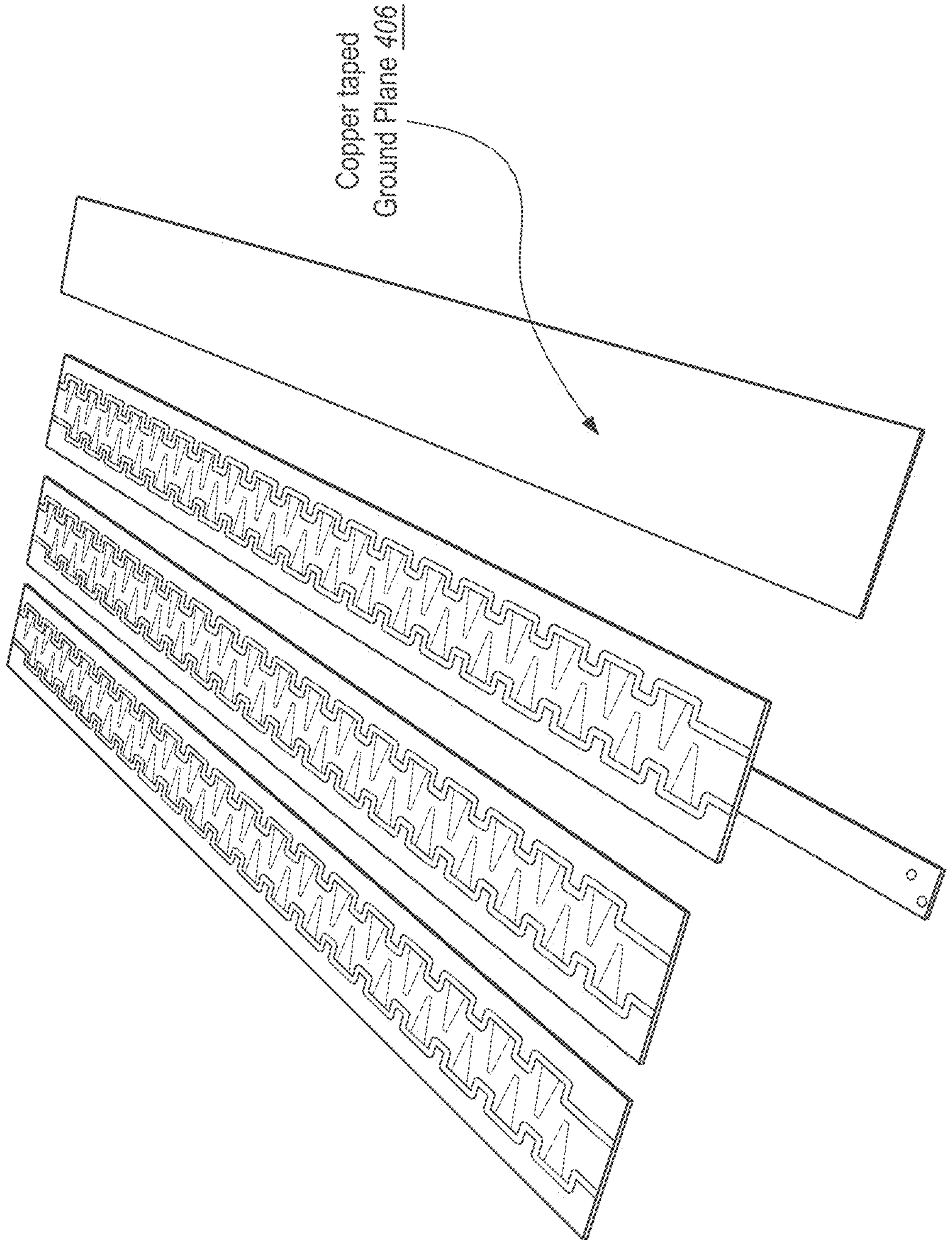
FIG. 4C illustrates an example solder-safe copper tape under the PET substrate.

FIG. 4C illustrates an example solder-safe copper tape under the PET substrate. The antennas can be cut out from the PET substrate to apply solder-safe copper tape under them to act as a uniform ground plane 406. In particular, a box-cutter and straight edge can be used to accurately cut out the LWAs, and rollers were used to smooth and bond the copper tape to the PET substrate.

Figure 4D:
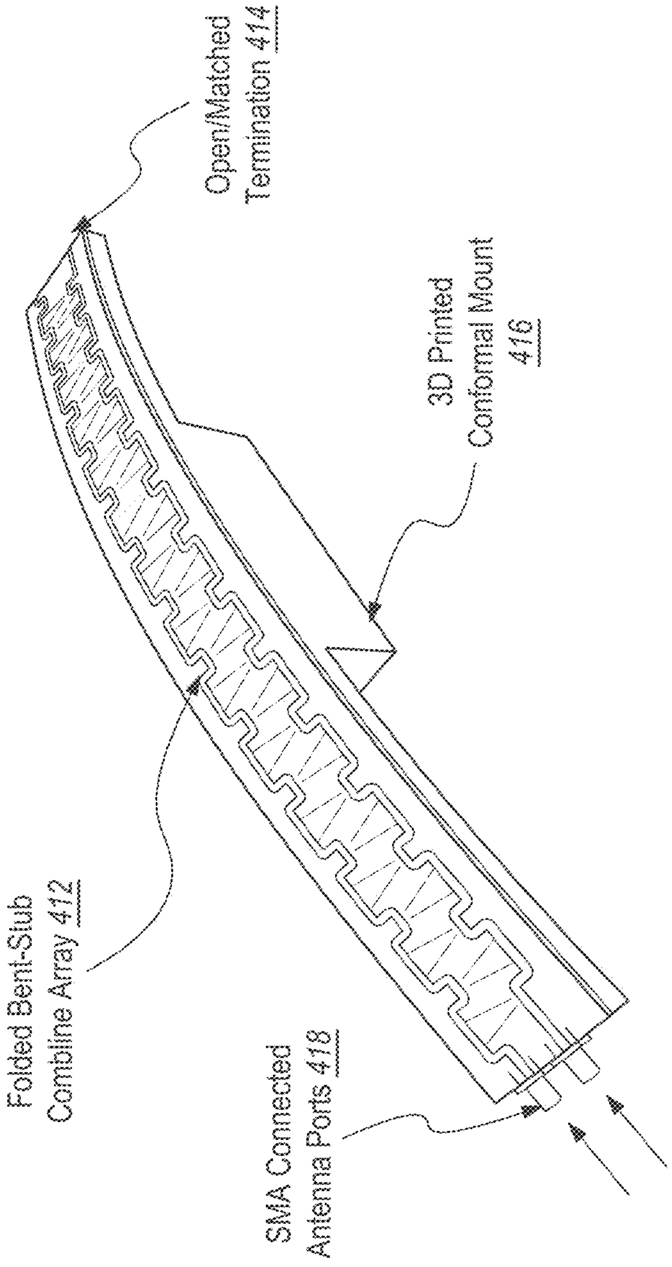
FIG. 4D illustrates an example PET substrate mounted on a flat/curved surfaces of custom three-dimensional (3D) printed mounts.

FIG. 4D illustrates an example PET substrate mounted on a flat/curved surfaces of custom three-dimensional (3D) printed mounts. For example, SubMiniature version A (SMA) connected antenna ports 418 can be soldered to the feeds of the LWAs which include a folded bent-stub combline array 412. The top overlay can be patterned to allow a direct access to the copper feed-line. The PET can include open/matched terminations 414 to allow the feed-line terminated in characteristics impedance or in an open. The PET substrate can be mounted on a 3D printed conformal mount 416.

Figure 4E:
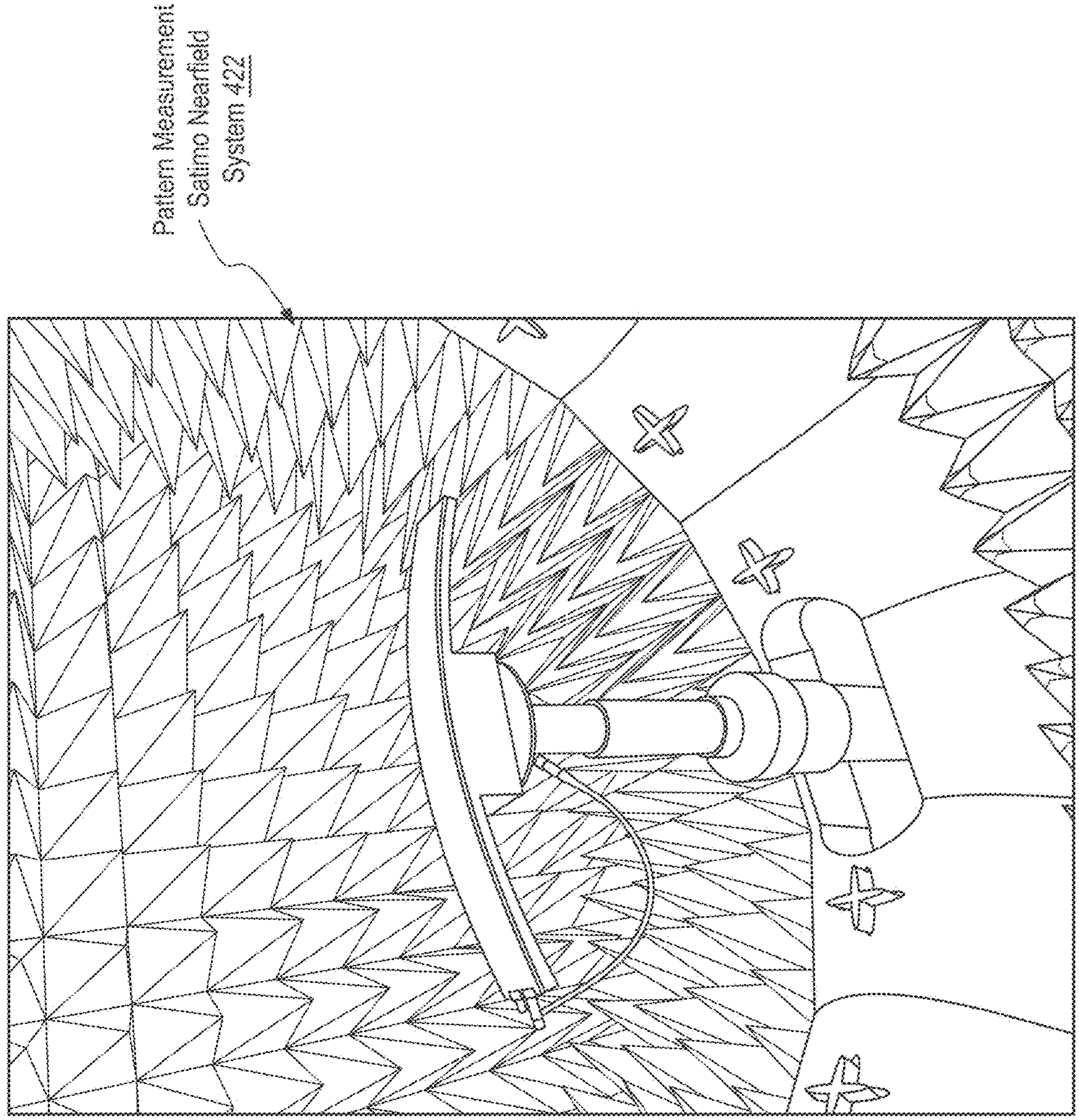
FIG. 4E illustrates an example PET substrate in a compact 3D nearfield Satimo measurement system.

FIG. 4E illustrates an example PET substrate in a compact 3D nearfield Satimo measurement system. In particular, the compact 3D nearfield Satimo measurement system 422 can include an array of probes which are electronically scanned with increased measurement speed and measurement accuracy. In an embodiment, the cut off antennas can include a conventional combline LWA, a folded combline LWA, a bent-stub combline LWA array, or a bent-stub folded combline LWA array. Characterization of various S-parameters and radiation patterns can be performed for the cut off antennas using the compact 3D nearfield Satimo measurement system.

3. Procedural Overview

Figure 5:
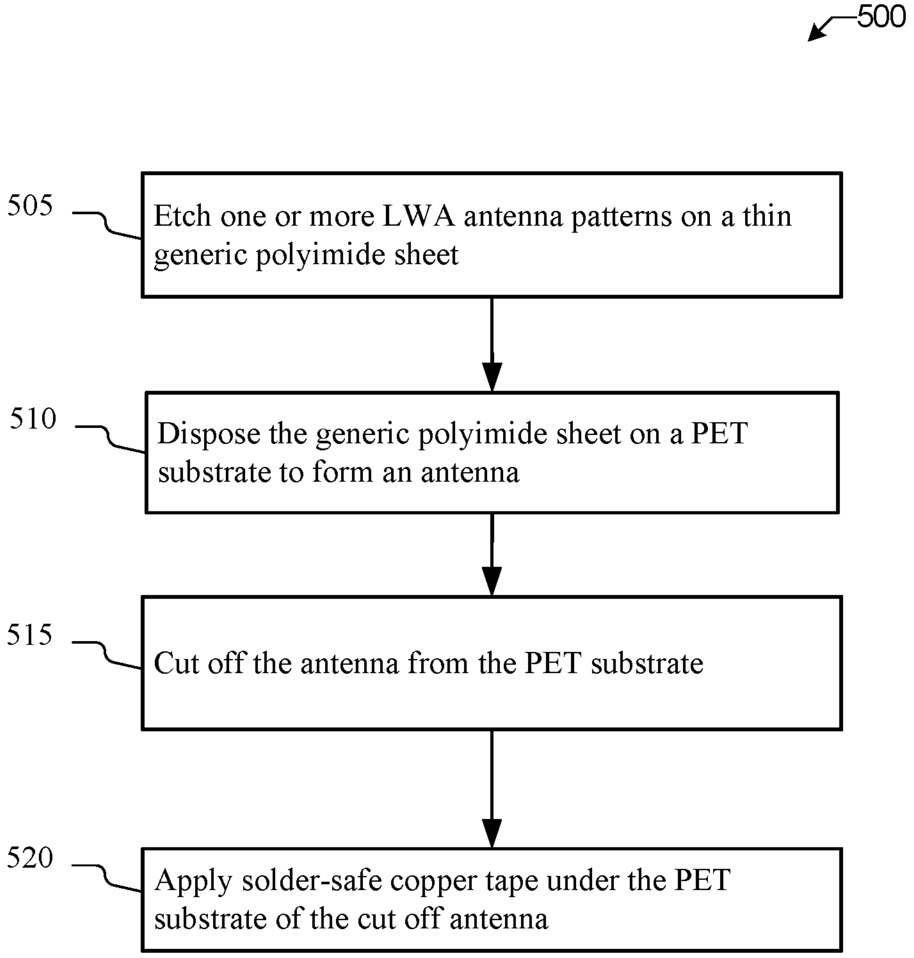
FIG. 5 illustrates a method and process for fabricating an antenna.

A method and process for fabricating an antenna of the present disclosure according to certain embodiments of the present disclosure is described in more detail with respect to FIG. 5. At step 505, one or more LWA antenna patterns are etched on a thin generic polyimide sheet. The thin generic polyimide sheet can be a PCB printed flexible polyimide sheet. The one or more LWA antenna patterns can be a conventional combline LWA structure, a folded combline LWA structure, a bent-stub combline LWA array, and/or a bent-stub folded combline LWA array. At step 510, the generic polyimide sheet is disposed on a PET substrate to form an antenna. In particular, the PET substrate is flexible and thin. For example, the PET substrate is 1 mm thick and has an $\varepsilon_r$ of 3.0 at 1 MHz. As another example, the generic polyimide sheet is bonded to the PET substrate with a heavy duty spray adhesive. At step 515, the antenna is cut off from the PET substrate. At step 520, solder-safe copper tape is applied under the PET substrate of the cut off antenna.

4. Implementation Examples

Figure 6A:
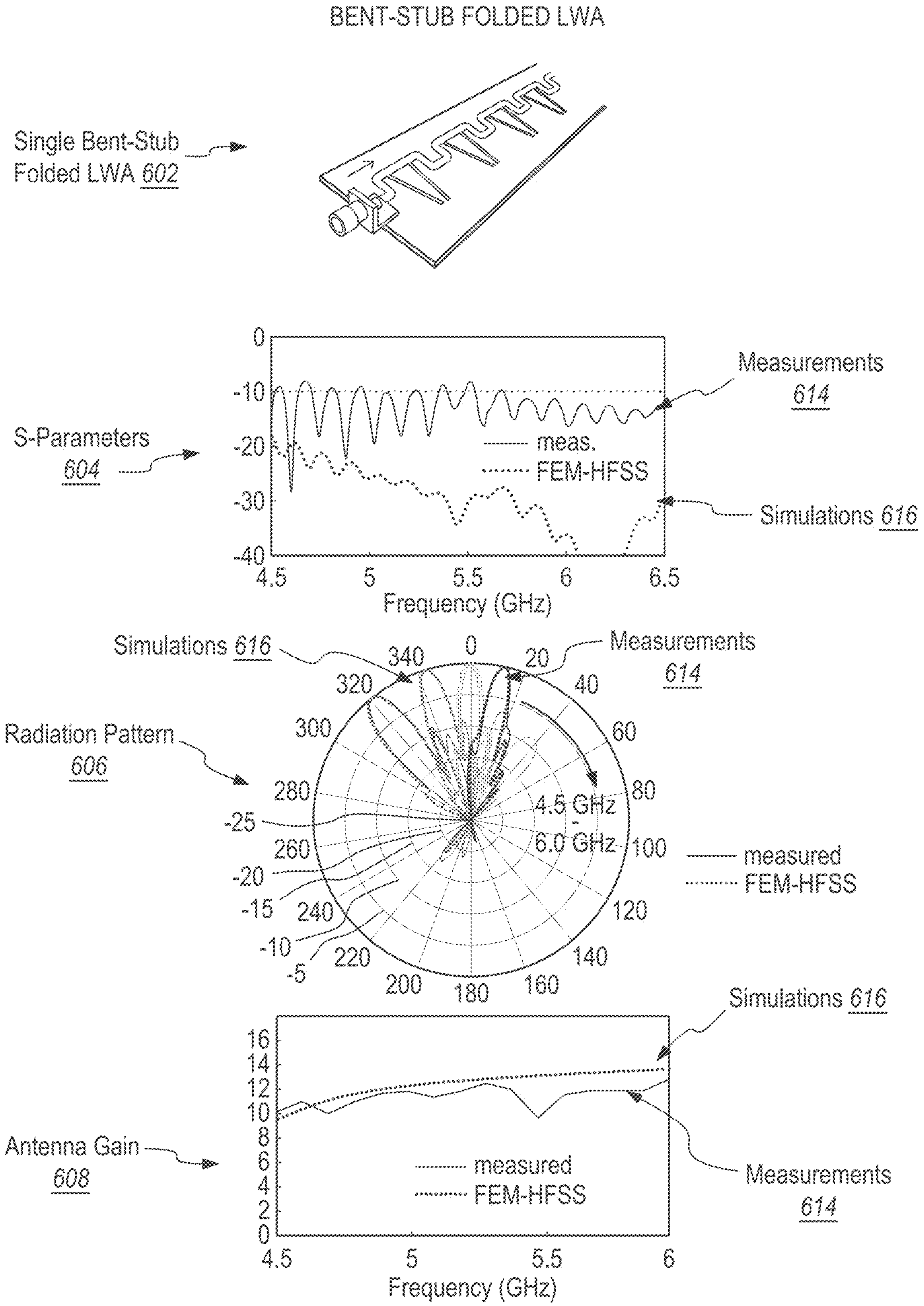
FIG. 6A, FIG. 6B, and FIG. 6C illustrate example S-parameters, radiation pattern, and antenna gain for a bent-stub folded LWA structure 602, a coupled LWA 612, and a manifold LWA 622.
Figure 6B:
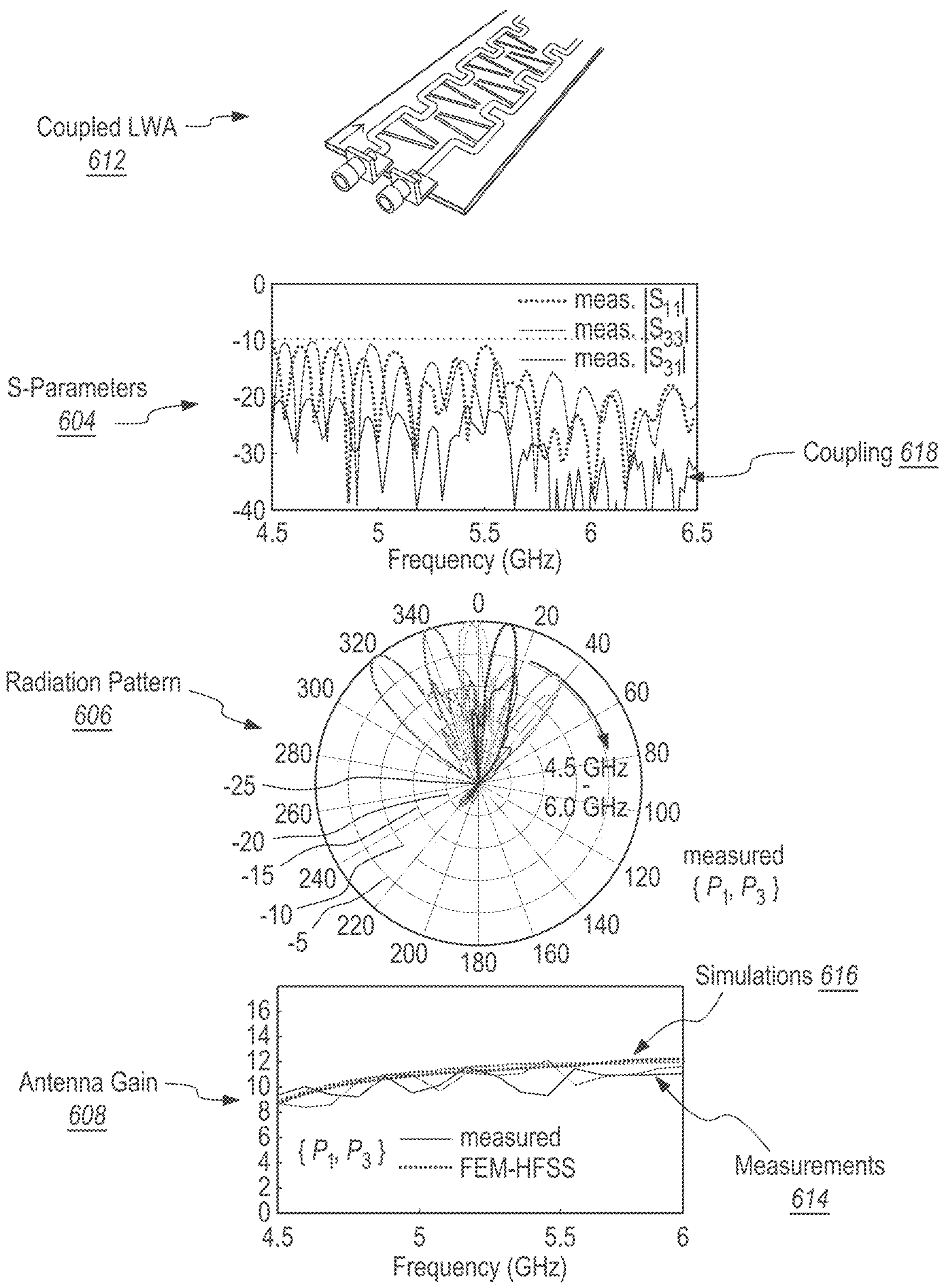
Figure 6C:
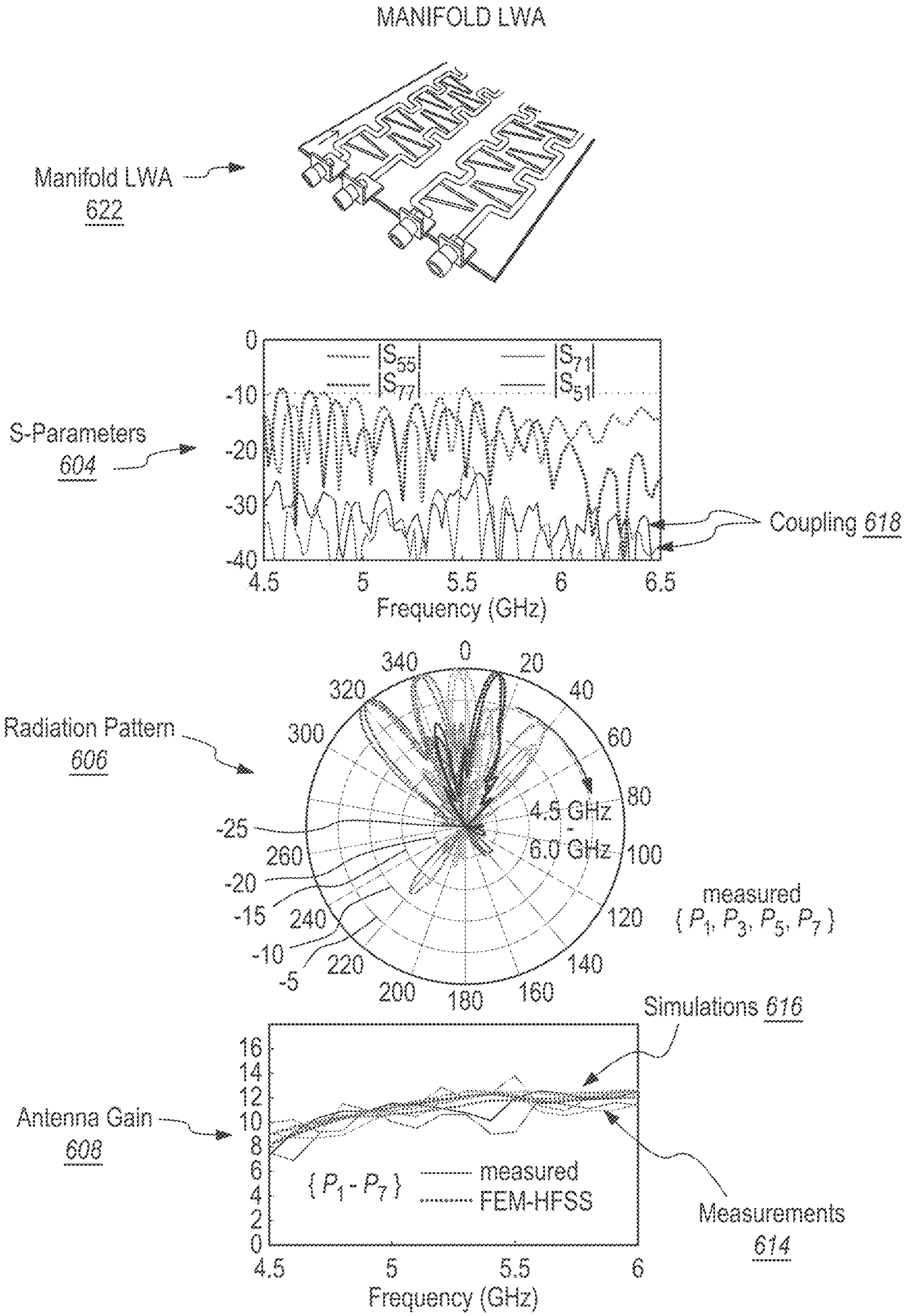

FIG. 6A, FIG. 6B, and FIG. 6C illustrate example S-parameters, radiation pattern, and antenna gain for a bent-stub folded LWA structure 602, a coupled LWA 612, and a manifold LWA 622. The characterization of various S-parameters 604 and the radiation pattern 606 is performed on l=40 cm length antennas, such as the single bent-stub folded LWA 602, the coupled LWA 612, and the manifold LWA 622, within 4.5 GHz and 6 GHz. The antenna design parameters can be found in Table 1. All three antennas, such as the single bent-stub folded LWA 602, the coupled LWA 612, and the manifold LWA 622, have a single forward-feeding SMA, where the output is left open with no termination for measurement simplicity. All three antennas show a good matching of $|S_{11}|<-10$ dB except for the single bent-stub folded LWA 602. In FIG. 6A, measurements 614 are degraded relative to simulations 616 for the S-parameter, such as $S_{11}$. Likewise, there is a difference of 3.8 dB for antenna gain 608 at broadside between measurements 614 and simulations 616. The difference of S-parameter and antenna gain can be due to tolerances and variations in the fabrication processes. However, the measured radiation pattern and simulated radiation pattern show an excellent match with a maximum beam bangle error of 1°. FIGS. 6B and 6C show a coupling 618 of less than −20 dB for the coupled LWA 612 and the manifold LWA 622, which is consistent with a very low coupling between the input ports of the respective LWA. There is also some difference for antenna gain 608 at broadside between measurements 614 and simulations 616. The difference in the antenna gain 608 can be due to inconsistencies in the fabrication processes. The difference also suggests the broadside antenna gain is more susceptible to fabrication tolerances than the rest of the frequency band.

Figure 7A:
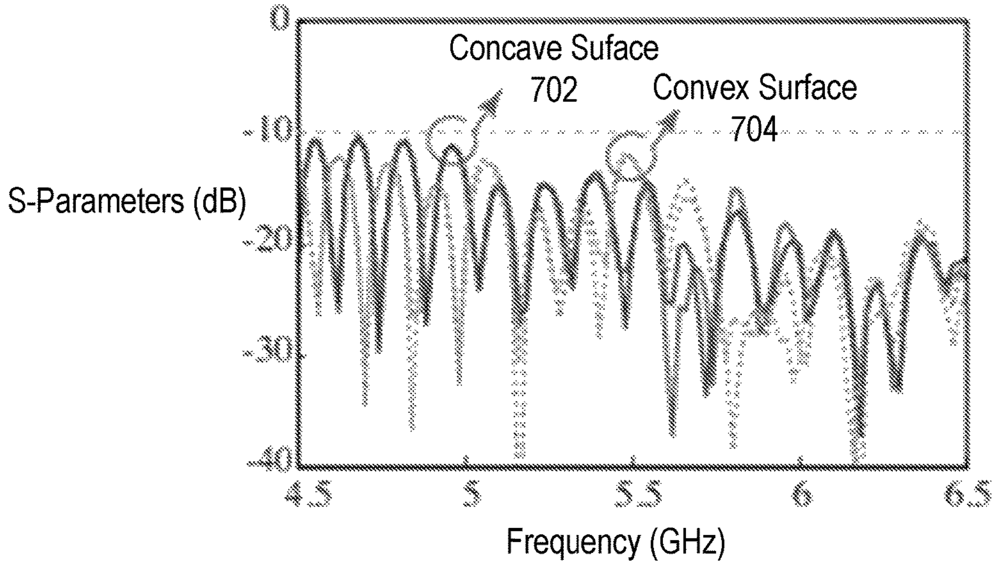
FIG. 7A, FIG. 7B, and FIG. 7C illustrate example S-parameters, antenna gains, and radiation patterns for a concave surface and a convex surface.
Figure 7B:
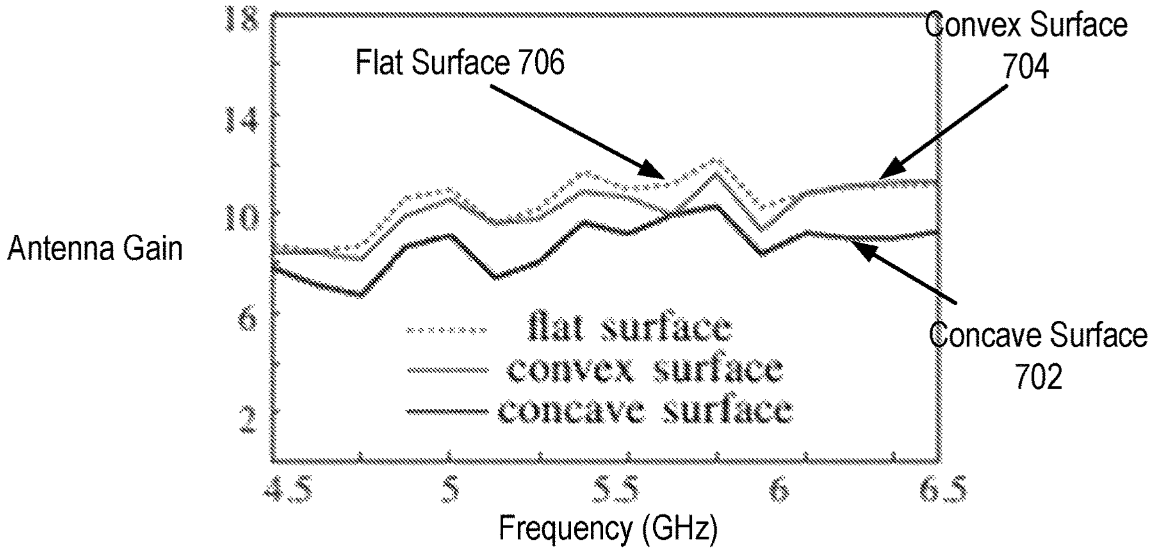
Figure 7C:
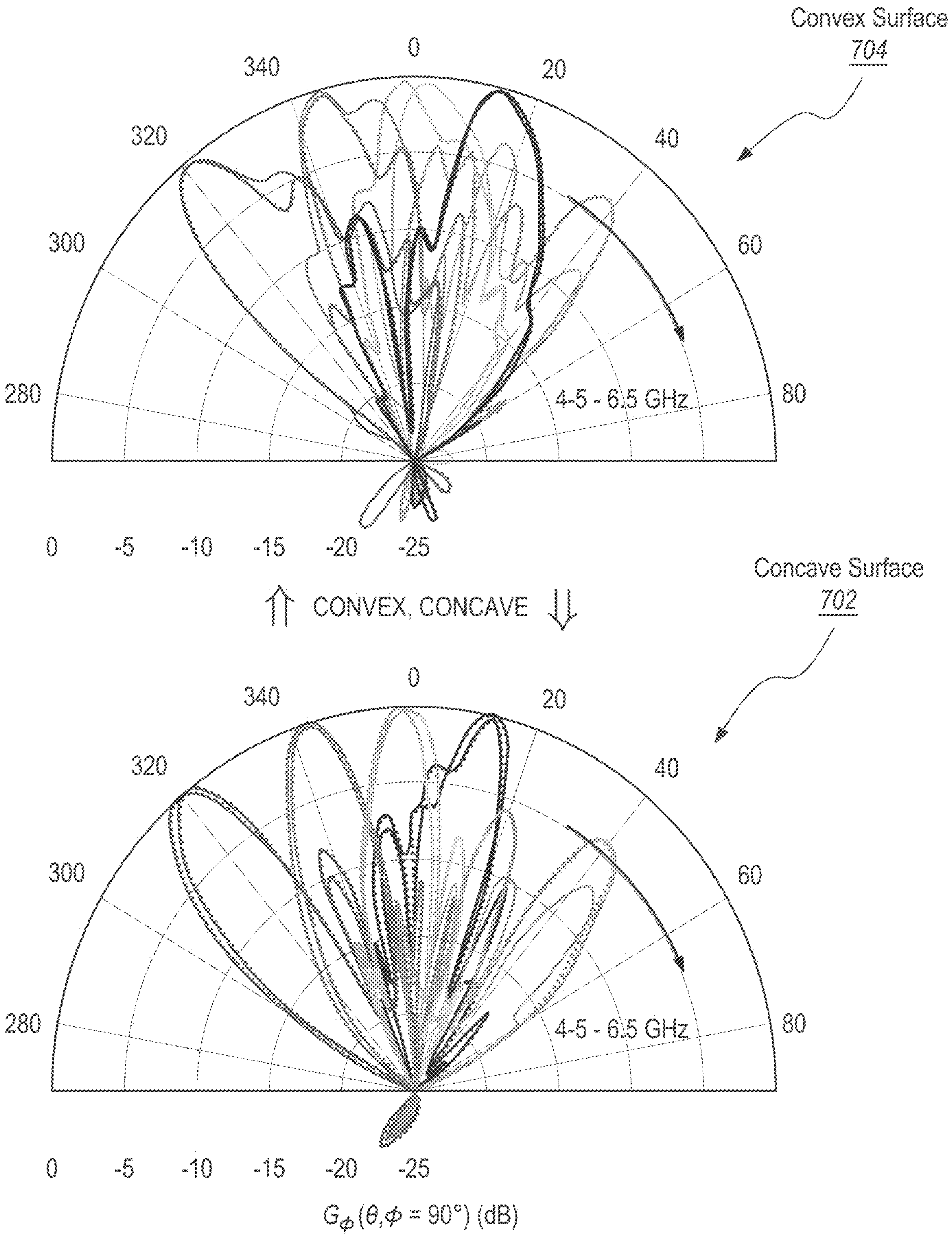

FIG. 7A, FIG. 7B, and FIG. 7C illustrate example S-parameters, antenna gains, and radiation patterns for a concave surface and a convex surface. Because the combline LWA structure is disposed on a flexible PET substrate, the antenna has flexibility and conformity to attach to a non-flat surface with radius of curvature of ±1000 mm, corresponding to a convex and concave configuration, respectively. FIG. 7A shows the measured S-parameter are well matched for the concave surface 702 and the convex surface 704 between 4.5 GHz and 6.5 GHz. FIG. 7B and FIG. 7C show there is some increase in the beamwidth with a decrease of antenna gain for the concave surface 702 and the convex surface 704 when compared to the flat surface 706. Likewise, for the same radials of bending, the concave surface 702 shows a significant decrease in the antenna gain compared to the convex surface 704, possibly due to an aperture for the concave surface 702 exposed to radiation from neighboring region causing more interference than the convex surface 704. The characterization result of S-parameters, antenna gains, and radiation patterns enables fitting the antenna to a desired curvature for better radiation performance.

Thus, the present disclosure provides a method and a system for a conformal and flexible bent-stub folded combline LWA structure on PET substrates for use. In the accompanying description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the techniques that are necessary to construct and use antennas of the embodiments that are illustrated and described, at the same level of detail that is used by people of skill in the arts to which this disclosure pertains to communicate with one another concerning antenna technology, structure, assembly, and use. That is, the level of detail set forth in this disclosure is the same level of detail that persons of skill in the art normally use to communicate with one another to express algorithms to be programmed or the structure and function of programs to implement the inventions claimed herein.

In the accompanying specification and this document, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An antenna system comprising:

a flexible and thin polyethylene terephthalate (PET) substrate stack having a length;

a printed circuit board (PCB) comprising one or more Leaky-Wave Antenna (LWA) structures on the PET substrate stack, wherein the one or more LWA structures have a bent-stub folded LWA configuration with longitudinal asymmetry and transverse asymmetry for a broadside frequency;

wherein the bent-stub folded LWA configuration comprises a plurality of conductively unit cells having a unit cell period, wherein each unit cell of the plurality of conductively unit cells has a folded main feed-line and a bent stub pair with two angularly bent radiating stubs.

2. The antenna system of claim 1, wherein the bent-stub folded LWA configuration comprises a single LWA antenna.

3. The antenna system of claim 1, wherein the bent-stub folded LWA configuration comprises two LWAs in a coupled LWA pair comprising two antennas interleaved with angularly bent stubs in a two-element array configuration, wherein one of the two antennas is shifted by a half of the unit cell period.

4. The antenna system of claim 1, wherein the bent-stub folded LWA configuration comprises a manifold LWA consisting of two pairs of coupled LWAs, wherein the coupled LWA pair comprises two antennas that are interleaved with angularly bent stubs in a two-element array configuration and wherein one of the two antennas is shifted by a half of the unit cell period.

5. The antenna system of claim 1, wherein the unit cell period is less than a guided wavelength at the broadside frequency, and the two angularly bent radiating stubs are separated by a distance that minimizes an open stopband (OSB) condition at the broadside frequency.

6. The antenna system of claim 5, wherein the distance is a quarter of the guided wavelength at the broadside frequency.

7. The antenna system of claim 1, wherein the two angularly bent radiating stubs have a bend angle having a measurement to reduce mutual coupling between input ports of the antennas.

8. The antenna system of claim 1, wherein the flexible PET substrate stack comprises a polyimide-adhesive-PET-adhesive ground configuration of PET and polyimide sheets.

9. The antenna system of claim 8, wherein the flexible PET substrate stack comprises a heavy duty spray adhesive on both the PET and polyimide sheets.

10. The antenna system of claim 1, wherein the flexible substrate has an effective thickness of 1.2 mm.

11. The antenna system of claim 1, wherein the flexible and thin substrate is bonded to a solder-safe copper tape as a ground plane on a surface of three-dimensional (3D) mounts.

12. The antenna system of claim 11, wherein the surface of the 3D mounts has a radius of curvature that matches a structure.

13. The antenna system of claim 11, wherein the broadside frequency is about 5.5 GHz.

14. A method of manufacturing an antenna system, the method comprising:

forming an antenna on a generic thin flexible polyimide film using printed circuit board (PCB) fabrication of one or more Leaky-Wave Antenna (LWA) structures on a polyethylene terephthalate (PET) substrate stack, wherein the one or more LWA structures have a bent-stub folded LWA configuration with longitudinal asymmetry and transverse asymmetry for a broadside frequency, the bent-stub folded LWA configuration comprising: a flexible and thin PET substrate stack having a length; and a plurality of conductively unit cells having a unit cell period, wherein each unit cell of the plurality of conductively unit cells has a folded main feed-line and a bent stub pair with two angularly bent radiating stubs;

bonding the generic thin flexible polyimide film and the antenna on a PET sheet;

bonding the PET sheet on a solder-safe copper tape.

15. The method of claim 14, wherein the bent-stub folded LWA configuration comprises a single LWA antenna.

16. The method of claim 14, wherein the bent-stub folded LWA configuration comprises two LWAs in a coupled LWA pair, wherein the coupled LWA pair comprises two antennas interleaved with angularly bent stubs in a two-element array configuration and wherein one of the two antennas is shifted by a half of the unit cell period.

17. The method of claim 14, wherein the bent-stub folded LWA configuration comprises a manifold LWA consisting of two pairs of coupled LWAs, wherein the coupled LWA pair comprises two antennas interleaved with angularly bent stubs in a two-element array configuration and one of the two antennas is shifted by a half of the unit cell period.

18. The method of claim 14, wherein the unit cell period is less than a guided wavelength at the broadside frequency, and the two angularly bent radiating stubs are separated by a distance that minimizes an open stopband (OSB) condition at the broadside frequency.

19. The method of claim 18, wherein the distance is a quarter of the guided wavelength at the broadside frequency.

20. The method of claim 14, wherein the two angularly bent radiating stubs have a bend angle having a measurement that reduces mutual coupling between input ports of antennas.

* * * * *